United States Patent
Duncan, Jr.

[15] 3,679,081
[45] July 25, 1972

[54] BIN CARRIER

[72] Inventor: Wilson B. Duncan, Jr., P.O. Box 846, Corning, Calif. 96021

[22] Filed: July 30, 1970

[21] Appl. No.: 59,560

[52] U.S. Cl..................................214/516, 214/85, 214/522
[51] Int. Cl............................................................B60p 1/36
[58] Field of Search.....................214/516, 522, 350, 353, 85

[56] References Cited

UNITED STATES PATENTS

| | | | |
|---|---|---|---|
| 3,539,067 | 11/1970 | Secrist | 214/83.26 |
| 3,341,039 | 9/1967 | Cranage | 214/83.26 |
| 3,089,601 | 5/1963 | Chaney et al. | 214/522 |
| 2,516,881 | 8/1950 | Jarvis | 214/516 |
| 3,392,858 | 7/1968 | Fernstrom et al. | 214/750 |
| 2,694,499 | 11/1954 | Mohrlang et al. | 214/518 |
| 3,432,053 | 3/1969 | Vereschagin | 214/518 |
| 3,561,627 | 2/1971 | Fisher | 214/518 |
| 2,298,448 | 10/1942 | Arentzen | 214/522 |

*Primary Examiner*—Gerald M. Forlenza
*Assistant Examiner*—Lawrence J. Oresky

[57] ABSTRACT

An automotive vehicle having a bin storing section for storing fruit bins along its length and at least one ramp, preferably on the leading end of the vehicle, including powered belt means on at least the ramp, and preferably on the storing section too, to engage fruit bins and to transport the bins up and down the ramp into and out of the bin storing section. The powered belts are preferably chain belts which are sprocket driven, and the belts on the ramp are preferably slightly offset from the belts on the storing section so that when a bin shifts from the ramp onto the storing section it promptly disengages the belts on the ramp, whereby the belts on the ramp and the belts on the storing section may be driven at different speeds.

Both the ramp and storing sections of the vehicle preferably have bottom and side rails to guide the bins.

In one embodiment, the vehicle has ramps at both ends thereof.

1 Claim, 9 Drawing Figures

INVENTOR
WILSON B. DUNCAN, JR

BY
Ernest L. Brown
ATTORNEY

INVENTOR
WILSON B. DUNCAN, JR.

BY *Ernest L. Brown*

ATTORNEY

INVENTOR
WILSON B. DUNCAN, JR.

BY
*Ernest L Brown*
ATTORNEY

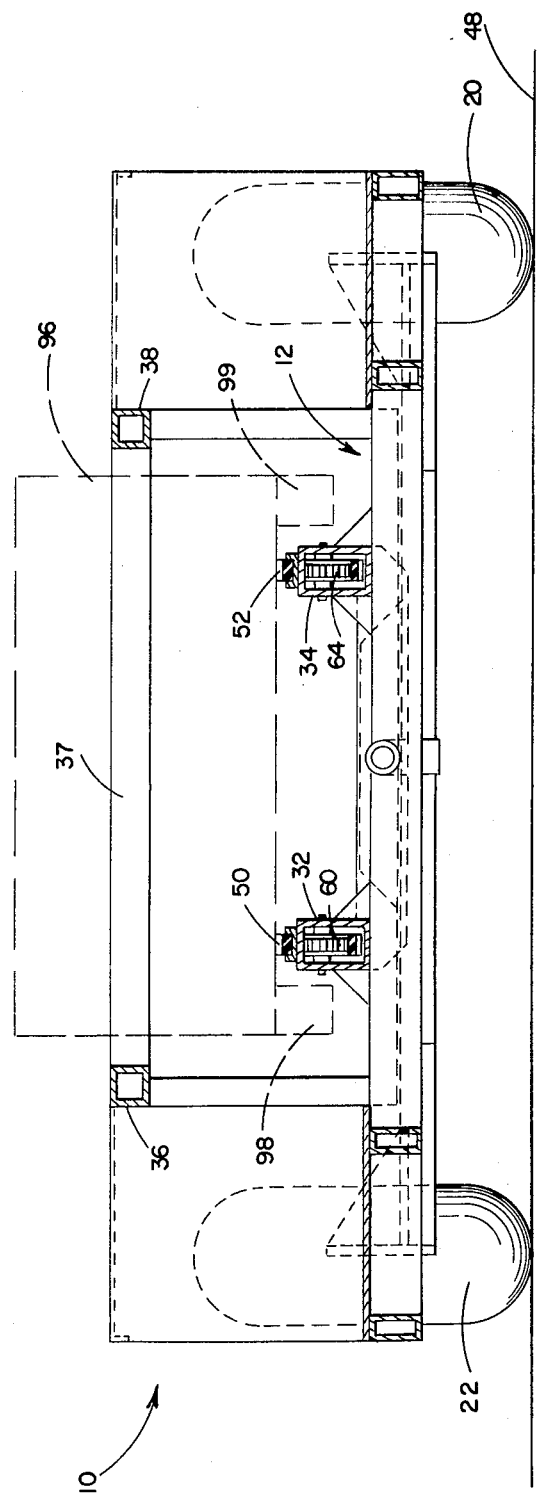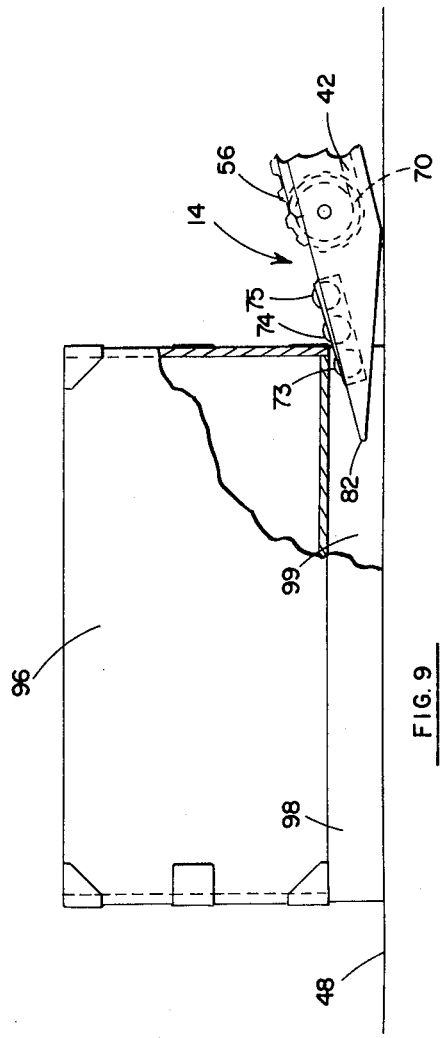
INVENTOR
WILSON B. DUNCAN, JR.
BY
Ernest L Brown
ATTORNEY

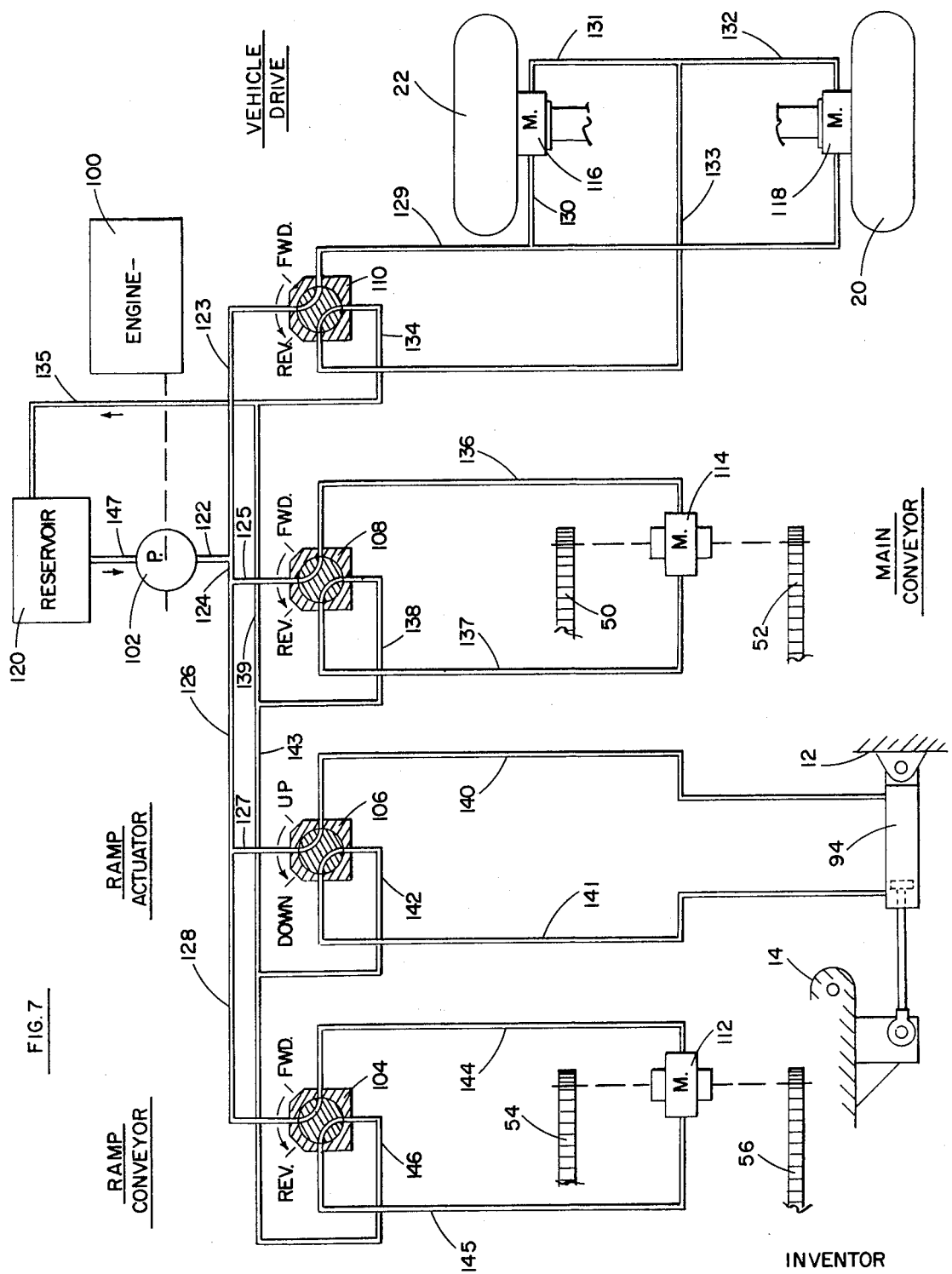

INVENTOR
WILSON B. DUNCAN, JR.
BY
Ernest L. Brown
ATTORNEY

BIN CARRIER

BACKGROUND OF THE INVENTION

This invention pertains to fruit bin carrying vehicles. It is expected that the invention belongs in United States Class 214–505.

When harvesting fruit, such as peaches or apples, the tree is shaken by a tree shaker, and the dropped fruit is placed in bins which are transported to a collecting center such as a cannery or fruit dryer.

In the past it has been customary to lift the bins onto a truck (perhaps with a fork lift). The truck then carried the bins to the collecting center where they were lifted off of the truck.

One apparatus for moving bins from the orchard to a collecting center is described in U.S. No. 3,432,053, issued Mar. 11, 1969 to Alex A. Vereschagin, et al. for an Automotive Bin Carrying Machine.

In the Vereschagin apparatus the bins are picked up by a fork lift on the front end of the vehicle. The storing section of the vehicle is tipped and carries dead rollers. After the fork lift is raised, the fruit bins are rolled on the dead rollers toward the back of the vehicle. When unloading, a rear ramp, containing dead rollers, is dropped and the loaded fruit bins are rolled back along the vehicle and down the ramp of dead rollers. The operator sits over the storing section, in the fashion of a lumber carrier, whereby the vehicle has a high profile and must be steered clear of the trees it is servicing.

BRIEF SUMMARY OF THE INVENTION

The apparatus contemplated by this invention comprises a vehicle which is adapted to carry fruit bins, including loading and unloading ramps, having powered belts for moving fruit bins thereon.

In a preferred embodiment, the invention comprises a vehicle having four traction wheels which are preferably driven by hydraulic motors. The vehicle has a bed between the wheels forming a storing section for fruit bins, including a pair of rails extending substantially parallel along the length of the bed and having powered conveyor belts on the rails. The conveyor belts are driven, preferably, by hydraulic motors. On the leading end of the vehicle is a ramp which preferably is hydraulically raised and lowered. The ramp has two substantially parallel rails having powered conveyor belts on the rails. The conveyor belts are preferably chain type belts which are sprocket driven. The sprockets are turned by hydraulic motors. The rails of the ramp and the rails of the bed are preferably aligned so that fruit bins may be transferred from the ramp to the bed and back again. To facilitate engaging of the fruit bins, the toes of the ramp preferably have a series of dead rollers thereon.

The rails on the bed and the ramp are spaced-apart a distance whereby standard sized fruit bins ride easily thereon with nominal clearance.

The vehicle of this invention, with its ramp lowered, approaches a fruit bin. The toe of the lowered ramp fits under the bin, whereby motion of the vehicle against the bin causes the bin to rise onto the dead rollers on the toes of the ramp rails. The powered belts are energized, drawing the bin up onto and along the ramp. As the bin clears the top of the ramp, it extends into the air. When the center of gravity of the bin reaches the top of the ramp, the bin tips, engaging the powered belts on the rails of the bed. Shortly thereafter the bin is firmly on the belts of the bed, and the belts of the ramp are disengaged from the bin. The bin is then moved back on the bed into a position awaiting the reception of the next bin.

Side rails are also supplied to the ramp and bed to prevent tipping of the bins.

When an optional rear ramp is used, the rear ramp may have powered belts, but usually it merely has a pair of substantially parallel rails with dead rollers thereon, whereby bins may be rolled down the rear ramp.

The bins may be unloaded through the front of the vehicle by merely reversing the direction of motion of the belts and backing away from the unloaded bins. Alternatively, when the vehicle has a rear ramp, the bins may be delivered to the rear ramp where they roll down the ramp to the ground. The vehicle merely drives away from the unloaded bins. In either method of unloading, the powered belts on the bed rails deliver the bins to the respective ramp.

It is also important to this invention to maintain the profile of the vehicle as low as practicable, whereby the vehicle may pass under low hanging branches. To that end, the driver rides to the side of the vehicle.

It has been found that the best source of power for this vehicle is hydraulic power. An engine driven pump produces hydraulic pressure which is controllably delivered to the main wheels of the vehicle, to the ramp actuators, and to the belt motors.

It is therefore an object of this invention to load, unload, and carry fruit bins, and the like.

It is a particular object of this invention to provide a vehicle which achieves the above object.

It is also a particular object to provide such vehicle with a low profile.

It is another particular object to provide such a vehicle with hydraulically powered drives.

It is a specific object of this invention to provide such a vehicle with substantially parallel rails on the bed thereof, and with at least a leading ramp with substantially parallel rails for loading and unloading fruit bins, said rails having conveyor means thereon for moving said bins.

It is a more specific object of this invention to provide such a vehicle wherein the conveyor means on the bed and the conveyor means on the ramp are separately powered.

It is yet a more particular object of this invention to provide such a vehicle wherein, when said ramp is lowered, fruit bins engage either the conveyor means on said bed or the conveyor means on said ramp, with a minimum of interference between said conveyor means.

BRIEF DESCRIPTION OF DRAWINGS

Other objects will become apparent from the following description, taken in connection with the accompanying drawings in which:

FIG. 5 is a view, partly in section, taken at 5—5 in FIG. 3;

FIG. 7 is a schematic diagram of a typical hydraulic control system for this invention;

FIG. 9 is a cutaway view of a fruit bin, showing the engagement of said bin by the toe of the ramp of the vehicle of this invention.

DETAILED DESCRIPTION OF INVENTION

Figure 1:
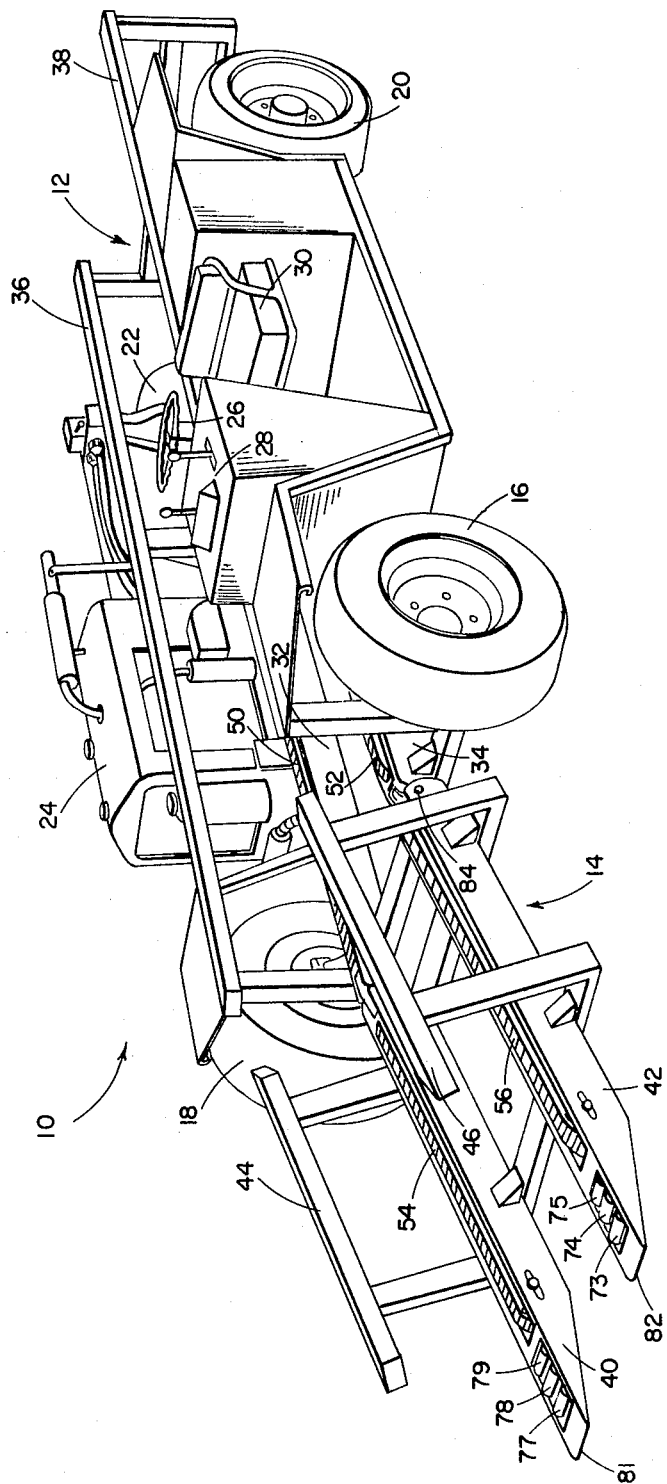
FIG. 1 is an oblique view of a preferred embodiment of the invention.
Figure 2:
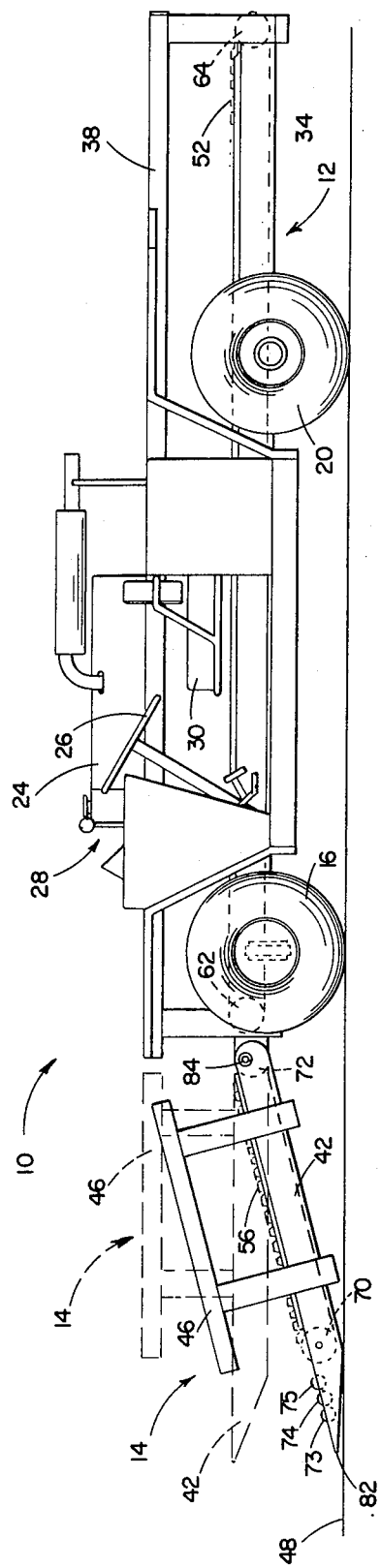
FIG. 2 is a side view of the vehicle of FIG. 1.

The vehicle, shown generally at 10, comprises a bed or body 12 and a leading ramp 14. The body 12 has four wheels 16, 18, 20, 22, each of which is driven by a hydraulic motor. Two of the hydraulic motors are shown schematically at 116 and 118 in FIG. 7. A hydraulic pump 102 and reservoir 120, together with an internal combustion engine 100 (FIG. 7) are housed in an engine housing 24, positioned on one side of the bed 12. The operator sits on seat 30, on the other side of the bed 12, adjacent the steering wheel 26 and control levers 28. Levers 28 are representative only. Only two levers are shown at 28. It should be noted, however, that more than two controls may (and usually are) be needed. Further, the placement of the controls is not critical, the shown position being by way of example only.

The bed 12 has two bottom rails 32 and 34 between the wheels and extending along the length of the bed 12. The rails 32 and 34 carry conveyor means such as chain conveyors 50 and 52. The bed 12 also has two side rails 36 and 38 to steady and center the fruit bins on the conveyors 50 and 52.

The leading ramp 14 is pivoted at 84 relative to the bed 12. A pair of hydraulic actuators, such as actuator 94 (FIG. 4), powers the lowering and raising of the ramp 14. The ramp 14 has two bottom rails 40 and 42 extending the length thereof. The rails 40 and 42 are tapered at their leading ends 81 and 82 to rest on the ground. On the leading ends 81 and 82 of the rails 40 and 42 are dead rollers 77,78,79,73,74,75 which are adapted initially to engage fruit bins enabling the fruit bins easily to roll onto the rails 40,42. The rails 40,42 carry conveyor means, such as chain conveyors 54 and 56. The ramp 14 also has two side rails 44,46 which are tapered on their front end to guide fruit bins between the side rails and to center the fruit bins onto the belts or conveyors 54,56.

The chain type conveyors 50,52,54,56 preferably have links which are serrated to engage the wooden portions of the floors of the fruit bins more firmly.

Figure 4:
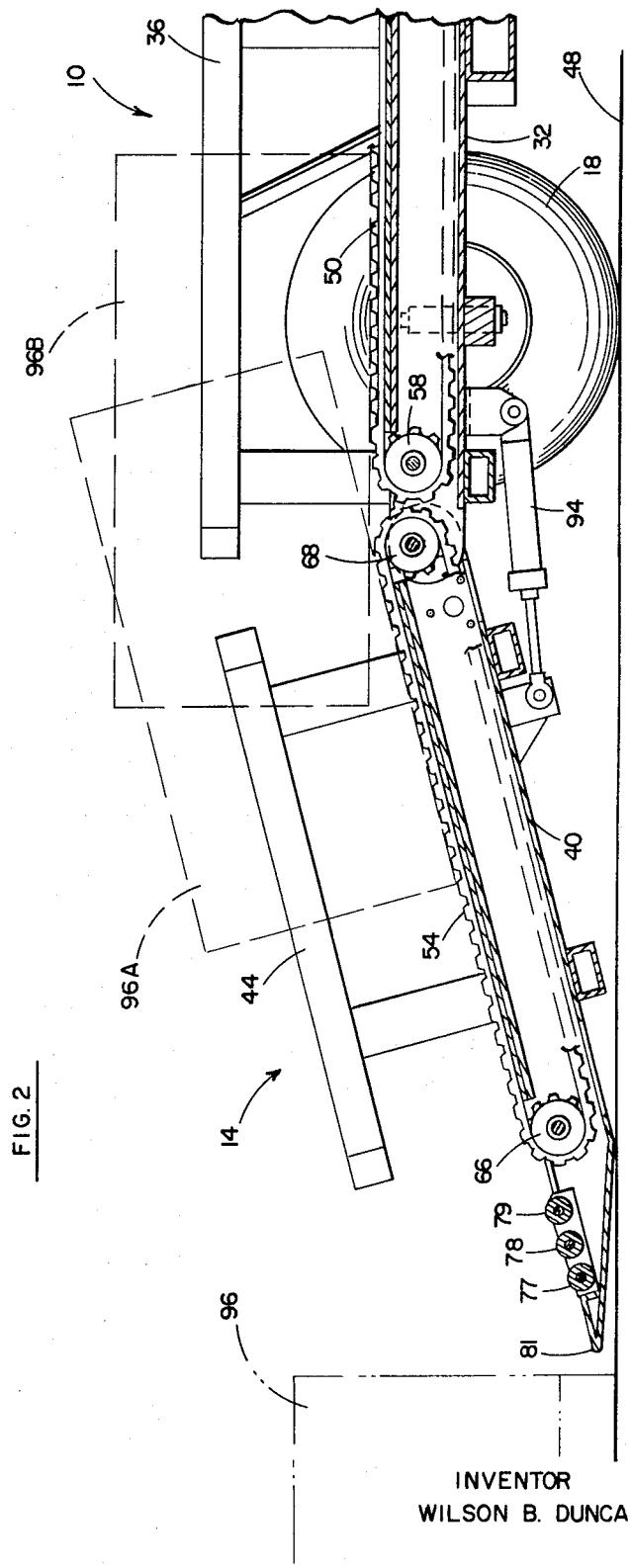
FIG. 4 is a view, partly in section, taken at 4—4 in FIG. 3.
Figure 3:
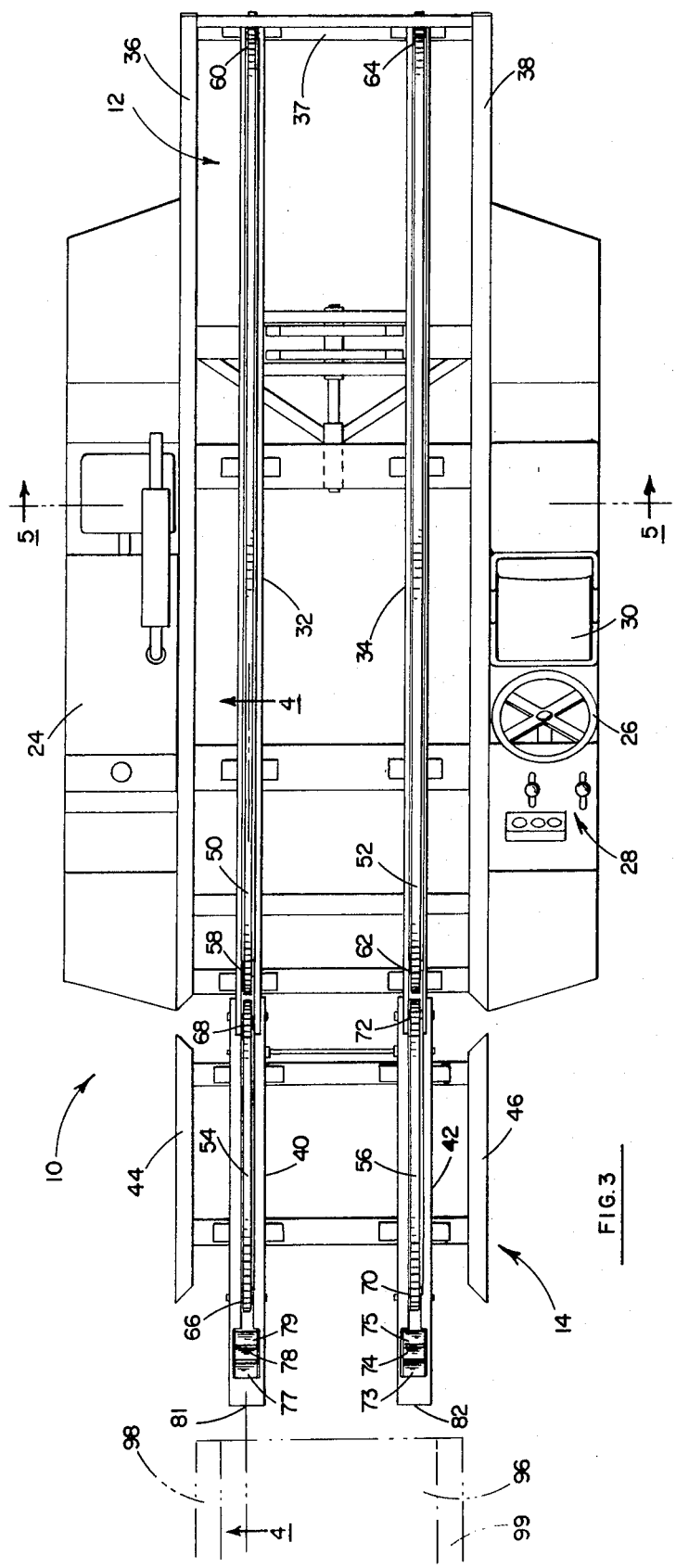
FIG. 3 is a top view of the vehicle of FIG. 1.

The chain belts are driven by sprocket drives. Details of the sprocket drives are shown in FIG. 4. The belt 50 rides along the top of the rail 32 from sprocket 58 to sprocket 60, then returns within the rail 32 to the sprocket 58. Similarly, the belt 52 rides along the top of the rail 34 from sprocket 62 to sprocket 64, then returns within the rail 34 to sprocket 62. In the ramp 14, the belt 54 rides along the top of rail 40 from sprocket 66 to sprocket 68, then returns within the rail 40 to sprocket 66. Similarly, the belt 56 rides along the top of rail 42 from sprocket 70 to sprocket 72, then returns within the rail 42 to sprocket 70. Each belt may be driven by only one of its sprockets, but in a preferred embodiment both sprockets on each belt are driven. Further, the belt 54 is preferably driven at the same speed as belt 56. The belt 50 is preferably driven at the same speed as belt 52. In a typical embodiment, the speed of the belts is on the order of 70 feet per minute.

It should be noted, as shown particularly in FIG. 4, that when the vehicle 10 is on substantially level ground, the line of the belt 54, extended, clears the belt 50 and the sprocket 58 so that a fruit bin in position 96A does not engage belt 50. Further, the line of belt 50, extended, clears the belt 54 and the sprocket 70 so that a fruit bin in position 96B does not engage belt 54. Thus, the belts 54 and 50 do not substantially interfere with each other, whereby they may be individually controlled. The geometric relation between sprockets 72 and 62 is the same as the geometric relation between sprockets 68 and 58. In a typical embodiment, the distance between the axles of sprockets 58 and 68 is on the order of 9 inches with separation between belts 50 and 54 about 2 inches. The length of a typical fruit bin 96 is 47 inches. Thus, when the fruit bin 96 tips from belt 54 to belt 50 or from belt 50 to belt 54, one or the other of the belts carries the load with both belts sharing the load for only a relatively short period of time. By driving the belts 50 and 54 at substantially the same speed during the transfer of a fruit bin from one belt to the other, interference is further minimized.

Figure 6:
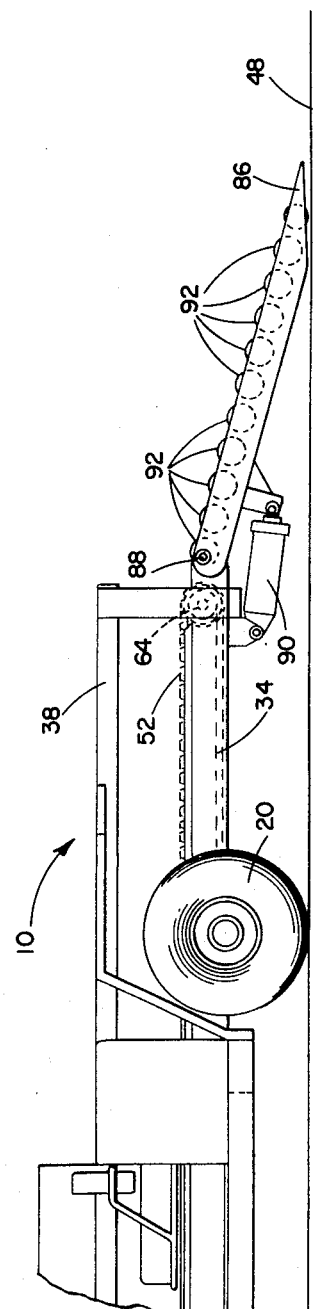
FIG. 6 is a side view of the rear portion of a modified version of the invention.

An alternative embodiment of the rear portion of the vehicle is shown in FIG. 6. A rear ramp 86, which may have a series of dead rollers 92, is pivoted about a horizontal axis at 88. An actuator 90 is used to lower or raise the ramp 86. Alternatively, the ramp 86 may have powered belts (not shown) in an identical fashion to the leading ramp 14.

A typical hydraulic control system for the vehicle 10 is shown in FIG. 7. Two hydraulic motors 116 and 118 are shown driving the wheels 22 and 20. Preferably there are two additional hydraulic motors driving wheels 16 and 18. A single hydraulic motor 114 is shown driving the belts 50 and 52. Preferably there is an additional hydraulic motor driving the belts 50 and 52 at the other end thereof. Alternatively, the belts may be separately driven, but this is not preferable. A single hydraulic motor 112 is shown driving the belts 54 and 56. Preferably there is an additional hydraulic motor driving the belts 54 and 56 at the other end thereof. Alternatively, the belts may be separately driven, but this is not preferable. A single actuator 94 is shown for raising and lowering the ramp 14. Preferably there is an additional actuator assisting actuator 94 on the other side of the ramp 14. Additional hydraulic mechanisms similar to that for controlling actuator 94 may be used to control actuator 90 on the optional rear ramp 86.

In FIG. 7, hydraulic fluid is stored in reservoir 120. A pump 102 pumps high pressure fluid from reservoir 120 into hydraulic lines 122,123,124,125,126,127,128. Additional throttle valves (not shown) may be placed in the individual lines to control the pressure. High pressure fluid is delivered to reversing valves 104,106,108,110. The reversing valves may optionally also include throttling means.

In the position shown, reversing valve 110 delivers high pressure fluid to conduits 129 and 130 to motors 118 and 116. Low pressure fluid returns from motors 118 and 116 through conduits 131,132,133,134,135, to reservoir 120. When the valve 110 is positioned in its reverse direction (not shown), high pressure fluid is delivered from valve 110 to motors 118 and 116 through conduits 133,132,131, and the low pressure return to valve 110 is through conduits 129 and 130, thereby reversing the direction of travel of the motors 116 and 118.

In the position shown, reversing valve 108 delivers high pressure fluid through conduit 136 to hydraulic motor 114. Low pressure fluid is returned to reservoir 120 through valve 108 and conduits 137,138,139,135. When the valve 108 is positioned in its reverse direction (not shown), high pressure fluid is delivered from valve 108 to motor 114 through conduit 137, and the low pressure return to valve 108 is through conduit 136.

In the position shown, reversing valve 106 delivers high pressure fluid through conduit 140 to hydraulic actuator 94. Low pressure fluid is returned to reservoir 120 through valve 106 and conduits 141,142,143,139,135. When the valve 106 is positioned in its reverse direction (not shown), high pressure fluid is delivered from valve 106 to actuator 94 through conduit 141, and the low pressure return to valve 106 is through conduit 140.

In the position shown, reversing valve 104 delivers high pressure fluid through conduit 144 to hydraulic motor 112. Low pressure fluid is returned to reservoir 120 through valve 104 and conduits 145,146,143,139,135. When the valve 104 is positioned in its reverse direction (not shown), high pressure fluid is delivered from valve 104 to motor 112 through conduit 145, and the low pressure return to valve 104 is through conduit 144.

Upon reversal of the respective valves 104,106,108,110, the respective controlled mechanisms, 112, 94, 114, 116,118 are caused to reverse.

OPERATION

Operation may be understood by referring first to the stick diagram of FIGS. 8A through 8I. Five fruit bins, 150, 151, 152, 153, 154 are shown being loaded onto and unloaded from the vehicle 10.

Figure 8:
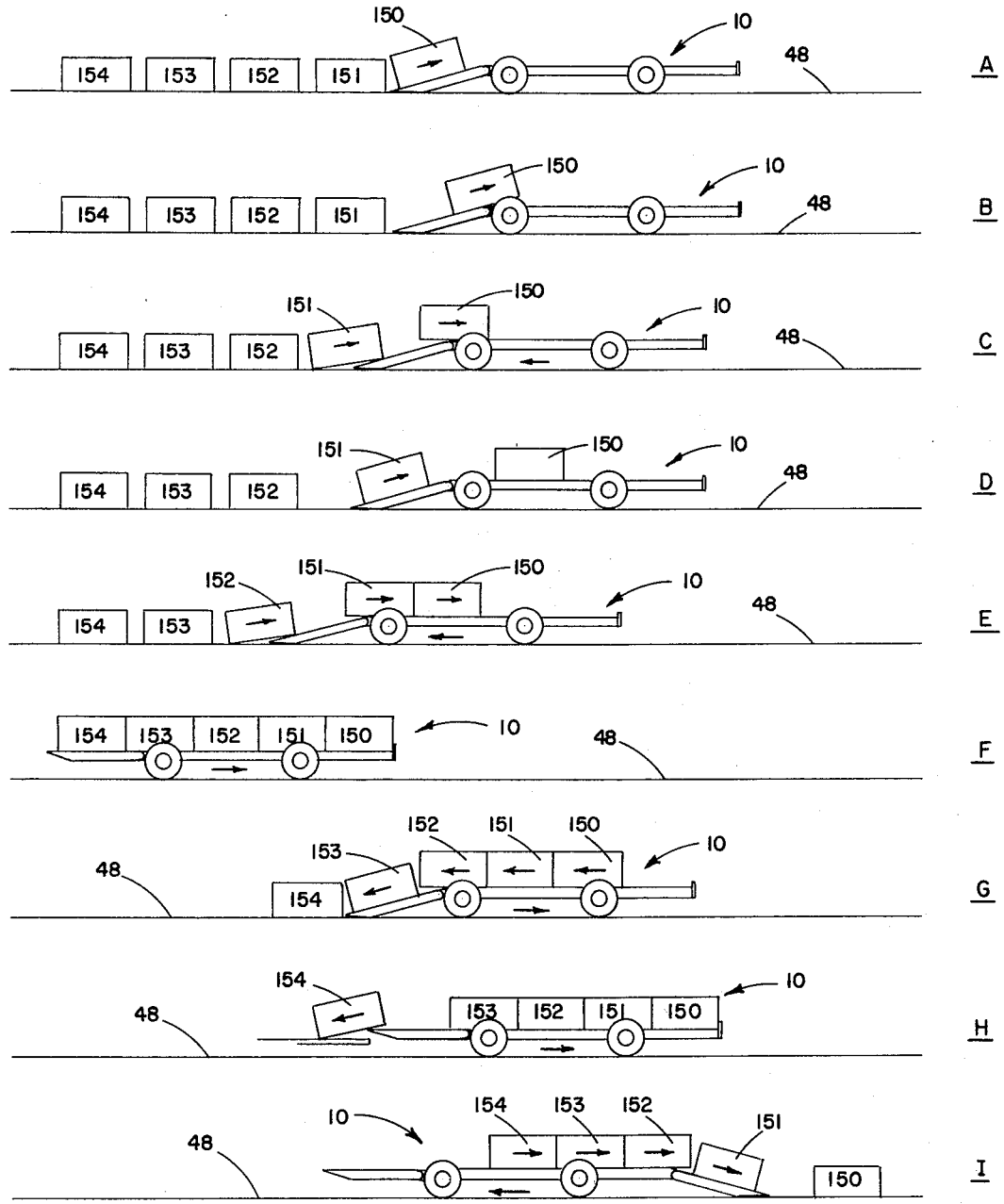
FIG. 8, in its parts A–I, is a stick model of the invention, for showing the operation of the vehicle.

In FIG. 8A, the vehicle 10 is shown with its leading ramp 14 lowered, with bin 150 positioned on ramp 14, and with belts 54 and 56 powered to move bin 150 up ramp 14. Usually the operator, if he has no other bins on belts 50 and 52, will operate belts 50 and 52 simultaneously with belts 54 and 56.

When bin 150 reaches the top of ramp 14, as shown in FIG. 8B, bin 150 projects into the air just prior to its rotating onto belts 50 and 52.

As the center of gravity of bin 150 passes over the top of the ramp 14, as in FIG. 8C, the bin 150 levels itself out which deposits bin 150 onto belts 50 and 52 of bed 12. The powered belts 50 and 52 are then operated to move the bin 150 toward the back of the vehicle a short distance, clearing the top of the ramp by a short distance. In a typical operation, the top of the ramp is cleared by about 18 to 24 inches. It is not practical to move the bin 150 clear to the back of the bed 12 against the back stop, for then the bin 150 would merely sit and rub against the belts 50 and 52, destroying the belts and the bins.

In FIG. 8D, the bin 150 is sitting on the stopped belts 50 and 52 while the bin 151 climbs the ramp 14 on the belts 54 and 56. To engage the bin 151, the vehicle 10 is moved to the left so that the toes of the ramp 14 (as shown in FIGS. 8C and 9). The bin rolls over the dead rollers 73–79 and onto the belts 54 and 56 which carry the bin up the ramp 14.

In FIG. 8E, bin 151 has reached the top of the ramp 14, has tipped into engagement with belts 50 and 52, and substantially into contact with bin 150. Belts 50 and 52 are then powered until bin 151 clears the top of the ramp by, for example, eighteen to twenty four inches. Belts 50 and 52 are then stopped. Vehicle 10 is shown moving to the left to engage bin 152.

The process continues until the entire bed 12 is filled, as shown in FIG. 8F. It should be noted that the last bin remains on the ramp 14, and that the ramp 14 is raised from the ground to carry bin 154.

To unload the vehicle, as shown in FIG. 8G, the ramp 14 is lowered, the powered belts 50,52,54,56 are energized, delivering bins 154,153,152,151,150 consecutively to the ground 48 as the vehicle 10 is driven away from the bins.

If it is desired, the bins may be unloaded onto a platform as shown in FIG. 8H. If unloaded onto a platform, the unloaded bins must consecutively be moved away from the vehicle to clear a path for the next unloaded bin.

When the alternate embodiment of FIG. 6 is used, the bins may be unloaded from the back end of the vehicle 10. When the ramp 86 is lowered, the bin 150 rolls down the dead rollers 92 into engagement with the ground. The vehicle then moves away from the bin 150. The bins are then moved on the bed 12 by the belts 50,52, to the right in FIG. 8I onto the dead rollers of the lowered ramp 86. As an alternate, the ramp 86 may have powered belts (not shown) to aid in discharging the bins.

As a practicable matter, the use of the rear ramp 86 is not warranted. The additional expense does not obtain substantial benefits. Further, when the bins are loaded from the front of the vehicle, a backstop must be placed on the ramp 86 to prevent the bins from falling off of the back. That stop must then be manually removed before bins may be discharged over the back of the vehicle. Thus the preferred embodiment is the one with the single ramp in the front, whereby bins may be handled without the operator leaving his seat.

When the operator desires to load a bin, he drives up to the bin by operating one of the controls 20. One of the controls 28 may, for example, be the reversing valve 110. It should be noted that the reversing valve 110 may be used as a throttle, for small motion of the valve throttles the flow. Combination throttle and reversing valves are known in the art, giving fine control on the flow of hydraulic fluid.

The lowering of the ramp 14 is accomplished by using valve 106. The handle for the control valve 106 may be one of the controls 28. It should be noted that although only two control handles are shown, that additional handles may be added at 28 or some other place convenient to the operator.

The toes 81,82 of the lowered ramp 14 fit under the fruit bin 96, between the side rails 98 and 99, as shown in FIG. 9. Forward motion of the vehicle causes the dead rollers 73–79 to engage the floor of the fruit bin 96, and the fruit bin 96 rolls onto the belts 54,56. The belts 54,56 preferably have serrated links which frictionally engage the floor of the bin 96. The belts 54,56 are powered by the operator's actuating valve 104, which may be controlled by one of the handles such as shown at 28. The belts 54,56 move the fruit bin up the ramp 14 until it reaches the position 96A. As the center of gravity of the fruit bin 96 clears the belts 54,56 at the sprockets 68, 72, the bin tips into position 96B on the belts 50,52 after a momentary engaging of belts 50,52,54,56 at the same time. The powered belts 50,52 are powered by controlling the valve 108, moving the fruit bin 96 along belts 50,52 until they are, for example, about eighteen to twenty four inches from the top of the ramp 14.

When a bin 96 is to be removed from the carrier 10, it is powered by belts 50,52 into position 96B. Further movement of the belts 50,52 causes the bin 96 to tip into position 96A, with only an interim small period of engagement of all of belts 50,52,54,56, engaging belts 54,56 which deliver the bin 96 to the ground. When the bin 96 engages the ground, the vehicle is backed away from the bin.

The raising and lowering of the ramp 14 is controlled by valve 106 which is typically attached to a handle such as the control handles 28.

Thus, the vehicle of this invention has a low profile, adapting it for use in orchards having low overhanging limbs. The vehicle is easily driven between orchard trees, engaging waiting fruit bins and loading them onto the vehicle. The vehicle is then driven to a central point where the bins are rapidly unloaded, and the vehicle returns to the orchard for another load of fruit bins.

Although the invention has been described in detail above, it is not intended that the invention should be limited by that description, but only in accordance with the spirit and scope of the appended claims.

I claim:
1. A bin carrier comprising:
   a vehicle bed, adapted to receive fruit bins;
   a plurality of wheels, attached to support and convey said bed;
   a source of power, positioned on the side of said bed;
   an operator position on the side of said bed;
   a ramp, attached by hinges to the front end of said bed, and adapted to receive and discharge fruit bins, said ramp being adapted to be raised and lowered on said hinges, and said ramp having a hydraulically powered chain belt conveyor positioned thereon to aid the raising and lowering of fruit bins, and said vehicle bed having a hydraulically powered chain belt conveyor positioned thereon to aid the moving of fruit bins on said bed, and in which said vehicle bed carries a source of hydraulic power connected to power said chain belt conveyors, and means for controlling said hydraulic power, and said bin carrier further comprising powered means, attached between said ramp and said bed, and control means to control the flow of power to said powered means to control the raising and lowering of said ramp, and said bed and said ramp each having two substantially parallel rails extending along at least a portion of the length thereof, and having said chain belt conveyors positioned on said rails, and in which said chain belt conveyors are sprocket driven and controlled, and at least a portion of said sprockets are driven by hydraulic motors, and in which said sprockets driving said belts on said ramp are positioned at a lower level than said sprockets driving said belts on said bed.

* * * * *